United States Patent Office 3,171,731
Patented Mar. 2, 1965

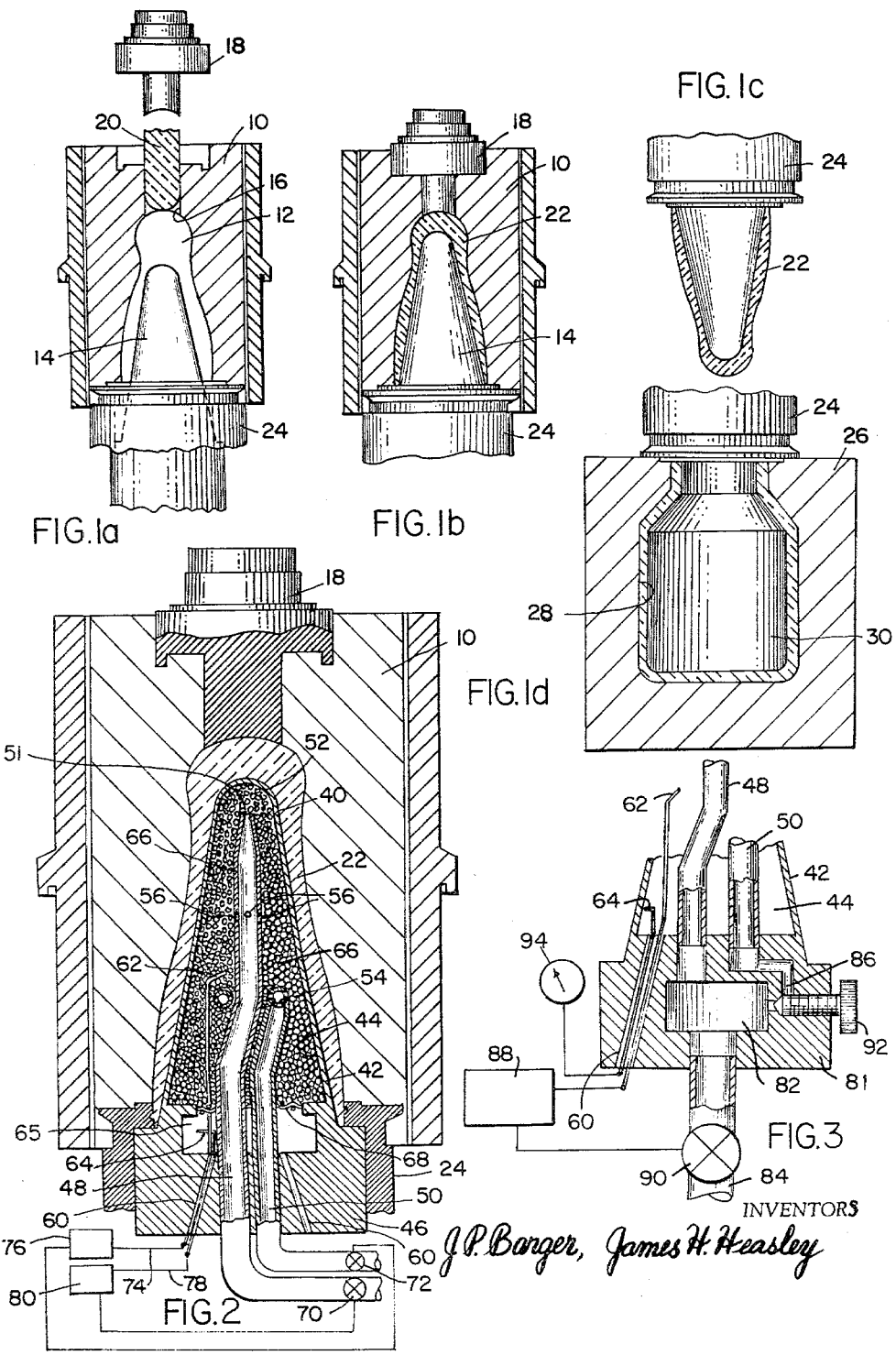

3,171,731
COOLING SYSTEM FOR GLASS FORMING
MACHINES
J Perry Barger, Arlington, and James H. Heasley, Boston, Mass., assignors to Glass Container Industry Research Corporation, New Castle, Pa., a corporation of Ohio
Filed July 3, 1961, Ser. No. 121,511
6 Claims. (Cl. 65—162)

This invention relates to the manufacture of glassware and more particularly comprises a new and improved method and apparatus for cooling glass article forming machines.

The surface quality of glassware which is formed by contact with a metal surface is affected by the temperature of the metal. Excessive metal temperatures result in surface defects caused by sticking of the glass to the metal. Low metal temperatures cause chill marks to form in the glass surface. The final shape of glassware produced by the press and blow method is also dependent in large part upon the metal temperature and temperature distribution. The viscosity of glass varies markedly with changes in temperature and as a result, the thickness of the wall of the glassware when the glass is blown is dependent upon the temperature of the glass during the blowing operation. That temperature is determined by the amount of heat extracted from the gob of glass initially deposited in the mold, and the heat extracted in turn is controlled by the temperature of the metal contacting the glass during the pressing operations.

In modern glass forming machines of the press and blow type, either water or air serves as the coolant used to control the temperature of the glass and the metal parts in contact with it. Water and air each have certain disadvantages when used as a coolant. When water is used, scale tends to build up on the metal surfaces contacted thereby, which necessitates periodic shut down for demineralization of the equipment. When full-time water cooling is used, the high pressure required to avoid boiling of the water introduces stress problems into the design of the equipment which makes thick walls necessary that may be undesirable in certain services. The low boiling point of water also makes it difficult to control the rate of heat extraction from the glass without using thick walls. When intermittent water cooling is used, severe cyclic stresses are imposed on the equipment.

The use of air as a coolant circulated through passages defined by ducts also may have disadvantages in certain equipment. The generally low heat transfer rate of air to metal may result in an inefficient and therefore relatively expensive cooling system. The cost of air cooled equipment is great because of the accuracy with which the air passages must be located in the metal walls of the cooling air distributor. In many cases, considerable effort is expended in drilling, plugging and redrilling holes or ducts in the cooling air distributor. Thus, the use of air as a coolant medium also may be expensive.

The primary object of this invention is to provide a cooling system which may be used in the plungers of press and blow type machines, in the molds and neck rings of such machines, and which also may be used in pressing plungers and molds, centrifugal casting molds, and rolls used in the formation of plate.

Another important object of this invention is to provide a cooling system for controlling the temperature of the entire glass contacting surface of one or more metal parts of a glass forming machine.

Another important object of this invention is to provide a method of cooling whereby the temperature of the entire glass contacting surface of a metal part of a glass forming machine may be maintained in a predetermined distribution, regardless of the heat input rate to that surface from the glass.

Another important object of this invention is to reduce the amount of coolant required to control the temperature of the glass contacting metal surfaces.

Yet another important object of this invention is to provide a method of measuring the temperature of the glass contacting surfaces without the use of temperature sensing devices in the walls of the parts.

Still another important object of this invention is to provide means for controlling the temperature level of the glass contacting surfaces of a glass forming machine from a remote station and without the necessity of changing the location and/or size of the parts of the machine.

To accomplish these and other objects in a press and blow type glass forming machine, the plunger of the machine preferably is made as a thin-walled hollow member substantially filled with a mass of discrete particles of material which is shape retaining and infusible at the operating temperatures of the apparatus, such particles being inert with respect to the coolant medium, to form a packed bed having coolant flow interstices defined between the particles substantially throughout the mass. The plunger which is open at one end contains a delivery duct or tube extending to the vicinity of the closed end and embedded in the mass of particles, through which a coolant, such as air or other selected fluid medium, may be directed into the particles and against the inner surface of the thin plunger wall at the closed end. A second duct or tube extends through the open end of the plunger and is embedded in the mass of particles to direct coolant among the particles closer to or near the open end of the plunger. The open end of the plunger or passages defined in a partial closure thereof permit the escape of the delivered coolant or air from the interior of the plunger as the coolant after absorbing heat is displaced by cooler coolant delivered or entering through the tubes or ducts. A temperature sensing device is disposed at the open discharge end of the plunger or escape passages and senses the temperature of the coolant or air leaving the plunger. An essentially linear relationship exists between the temperature of the coolant or air leaving the plunger and the temperature of the wall cooled by the coolant delivered by the second duct or tube. A second temperature sensing device may be disposed in the plunger beyond the end of the second duct or tube to measure the temperature of the coolant or air leaving the closed end of the plunger cooled by the coolant or air from the first duct. Thus, the temperature measured by the second temperature sensing device bears a linear relationship to the temperature of the walls of the plunger cooled by the coolant or air from the first duct.

The packed bed of shape-retaining particles causes the coolant or air introduced through the delivery ducts or tubes to contact the walls of the plunger with a uniform velocity for a given air input rate. Therefore, the cooling action of the coolant or air upon the wall may be controlled by the input rate of the coolant through the ducts. This may be effected automatically by operatively connecting the temperature sensing devices to flow rate control members in the ducts. Independent flow rate controllers and temperature sensing devices enable the separate and independent control of the surface temperatures at different parts of the plunger.

It will be seen therefrom and the following detailed description that the invention provides in apparatus for shaping molten glass a system for controlling the cooling of extended areas of the glass contacting surfaces of shaping apparatus bodies which comprises means defining the glass contacting surfaces in the form of walls of heat conducting material and adjacent chamber space. A mass of discrete particles of material which is shape retaining and infusible at the operating temperatures of the apparatus substantially fills or is packed into the chamber space with coolant flow interstices defined between the particles substantially throughout the mass. Duct means are provided to supply flowing coolant into this mass at a plurality of distributed points for uniform distribution of the flowing coolant throughout the packed chamber space to assure substantially uniform heat absorption and cooling effect with maintenance of substantially uniform temperatures at all points.

These and other objects and features of our invention, along with its incident advantages, will be better understood and appreciated from the following detailed description of two embodiments thereof, selected for purposes of illustration and shown in the accompanying drawing, in which:

FIGS. 1a to 1d inclusive illustrate the sequence of operations for the production of containers by the press and blow process;

FIG. 2 is a cross sectional view of a press and blow plunger embodying the invention; and FIG. 3 is a fragmentary cross sectional view of a modification of the plunger shown in FIG. 2.

In FIGS. 1a to 1d inclusive a blank mold 10 is shown provided with a cavity 12 open at the bottom to permit entry of a plunger 14. Access for a glass gob is provided to the top of the cavity 12 through an opening 16 ordinarily closed by a baffle 18. In FIG. 1a the baffle 18 is removed from the opening and a gob of glass 20 is shown being introduced into the cavity 12 through the opening. It will also be noted in FIG. 1a that the plunger 14 has not yet reached or been raised to its normal glass forming or shaping position within the blank mold.

In the blank mold 10 the plunger 14 in cooperation with the walls of the cavity 12 forms or shapes the gob of glass 20 into a rough blank or parison 22. In FIG. 1b the formed parison 22 is shown. Note in FIG. 1b that the baffle 18 closes the passage 16 through which the gob of glass is introduced, and the plunger 14 is in its molding position within the blank mold 10. After the parison is formed or shaped, the blank mold 10 which is ordinarily made in two sections is opened, the plunger is removed, and the parison is supported by the neck mold or ring 24.

During the molding or shaping of blank or parison 22 the neck of the container is placed in its final form. Therefore, continued engagement of the top of the parison by the neck ring does not interfere with final forming or shaping of the container. Continuing with the description, after the neck ring 24 has removed the parison from the blank mold 10, the neck ring inverts the parison to the position shown in FIG. 1c and transfers it to the final or blow mold 26, as is shown in FIG. 1d. In the blow mold 26 the glass is blown into shape against the inner surface 28 of the mold cavity 30, as is depicted in FIG. 1d.

As suggested in the introduction, the quality of the glassware is greatly affected by the temperature of the metal parts in contact with the glass during molding. Particularly critical is the surface temperature of the plunger 14 used in a press and blow glass forming process. Not only is the surface quality of the glassware affected by the surface temperature of the metal parts, but the thickness of the walls of the glassware is also dependent upon the surface temperature of the metal parts. The viscosity of the glass during the blowing operation will of course in major part determine the wall thickness of the container which results. Non-uniform temperatures of different parts of the parison results in varying viscosities of the glass at the different parts which in turn causes variations in wall thickness when the parison is blown. To control the viscosity of the glass it is necessary to control the temperature of the metal surface of the plunger, for its temperature determines the amount of heat extracted from the glass before blowing. The lower the plunger temperature, the more heat it will extract from the glass. Desired differences in wall thicknesses may be achieved by controlled variations of the temperature of the outer surface of the plunger from one area to another.

In FIG. 2 means for precisely controlling the temperature of the outer surface of the plunger are shown. In FIG. 2 the blank mold 10 is shown by way of example to be identical to that shown in FIGS. 1a and 1g. A specially made plunger 40 cooperates with the cavity 12 in the mold 10 and the neck ring 24 to form the parison 22.

The plunger 40 is provided with a relatively thin exterior wall 42 which defines a hollow chamber 44. The lower end of the wall 42 terminates in a collar 46 that is carried by the plunger support (not shown) which moves it to its various operating positions. A pair of coolant delivery tubes 48 and 50 extend through the collar 46 into the chamber 44. Tube 48 has a nozzle tip 51 which terminates adjacent the closed end 52 of the plunger 40 and tube 50 terminates in a ring nozzle 54 which surrounds the tube 48 preferably in the mid-section of the chamber. The tubes 48 and 50 are provided to introduce a coolant into the chamber. The nozzle tip end 51 of tube 48 is open and additional openings preferably are provided at 56 above the ring nozzle 54 to discharge coolant from this delivery tube. The ring nozzle 54 is provided with circumferentially spaced perforations at least in its outer wall to discharge coolant from the delivery tube 50.

A plurality of exhaust passages 60 provided through the collar 46 communicate the bottom of the chamber 44 to atmosphere for exhausting coolant introduced into it through the tubes 48 and 50. Disposed in one or more of the exhaust passages 60 are electrical leads which are connected to a thermocouple 62 disposed just above the ring nozzle 54 of delivery tube 50 and a second thermocouple 64 is disposed at the upper end of the exhaust passages, preferably in recess 65 thereat. As will be explained more fully below, the thermocouples 62 and 64 are employed to measure the temperature of the coolant after it has served to cool the different parts of the wall 42.

The chamber 44 is packed with discrete particles 66 which surround the delivery tubes 48 and 50. The particles 66 are in contact with the entire inner surface of the wall 42 which cooperates with the blank mold 10 and neck ring 24 to form the parison. Some form of porous packing or screen 68 is used to retain the particles within the chamber 44 and keep them out of exhaust recess 65. The discrete particles may be metal balls, or may take any other form and be made of any substance which does not react with the coolant used. The discrete particles 66 are formed from material which is shape retaining and infusible at the operating temperatures of the apparatus so that they will not undesirably soften to distorted shapes or fuse at the operating temperatures which may tend to block or reduce free flow therebetween of the coolant and thus through some portions of the mass thereof. Substantially uniform flow of the coolant throughout the mass of discrete particles is desirable. When good heat conductivity through the mass of discrete particles 66 is desired for rapid withdrawal of heat from the plunger wall 42 the particles are formed from material having relatively high heat conductivity, such as a high melting point metallic material. When it is desired to check the rate of heat withdrawal from the plunger wall to avoid chill mark difficulties remarked above the discrete particles may be formed of suitable refractory material. The discrete particles 66 should be in the form of beads bounded by curvilinear surfaces, such as ovoids or spheres, assuring the provision of interstices therebetween to serve as free flow passages throughout the entire mass or packed bed thereof.

When the discrete particles 66 are metallic to have good heat conductivity and thus appreciable electrical conductivity it is desirable to insulate the mass or packed bed thereof from the thermocouple 62 embedded therein. This may be accomplished by protectively housing thermocouple 62 in a thin walled ceramic envelope or tube. In the event that the discrete particles 66 are of material having low heat and electrical conductivity, such as refractory material, such an insulating ceramic envelope or tube need not house any such thermocouple embedded in the mass of discrete particles.

When a coolant, such as air, is introduced through the tubes 48 and 50, the packed bed of discrete particles 66 causes the coolant to contact the walls of the plunger with a uniform velocity over the area controlled by the cooling system. The upper portion of the plunger wall lying above the plane of the ring nozzle 54 is cooled by the coolant discharging from tube 48 and this cooling takes place uniformly over that surface. Similarly, the lower portion of the plunger wall 42 below the plane of the ring nozzle 54 is cooled uniformly by the coolant which discharges from the tube 50. The rate at which the coolant discharges from the respective tubes 48 and 50 through their nozzle apertures controls the rate of cooling of the parts of wall 42.

Valves 70 and 72 are mounted in the coolant supply or delivery tubes 48 and 50, respectively, outside the collar 46 of the plunger, and these valves control the rate of flow of coolant through each of these tubes. The thermocouple 64 is connected by lead 74 to an amplifier and proportional controller unit, represented by box 76, which in turn is connected to the valve 72. Similarly, the thermocouple 62 is connected by lead 78 to another amplifier and proportional controller unit, represented by box 80, in turn connected to the valve 70. Each of the thermocouples in this manner controls the setting of the valves to regulate the rate of flow of coolant into the plunger through the tubes 48 and 50.

As is suggested above, the thermocouple 62 is positioned to sense the temperature of the coolant discharged from pipe 48 and which cools the upper portion of the plunger wall 42. The temperature of the coolant being discharged and sensed by the thermocouple 62 is proportional to the temperature of the plunger wall 42 at the upper end of the plunger 40. Similarly, the temperature of the coolant sensed by thermocouple 64, which cools the lower portion of the plunger wall 42 is proportional to the temperature of that part of the wall. The valves 70 and 72 facilitate the independent flow rate control of the coolant into different portions or sections of the plunger. By adjusting the amplifier and proportional controller units 76 and 80, the flow rates through the respective coolant supply tubes may be made the same, or may be controlled amounts different from each other, the temperature of each being independently maintained by its controller unit.

In FIG. 3 another arrangement for controlling the flow rate of the coolant to different parts of the plunger chamber is suggested. In this arrangement, the collar 81 of the plunger is provided with a supply chamber 82 to which coolant is supplied by a single duct or tube 84. The coolant supply chamber 82 communicates directly with the tube 48 and through a needle valve passage 86 with the tube 50. As in the embodiment of FIG. 2, a pair of thermocouples 62 and 64 are provided to measure the temperature of the coolant after it has cooled the upper and lower portions or sections of the plunger wall 42, respectively. A single amplifier and proportional controller unit 88 controls the position of a valve 90 in the supply tube 84 to govern the flow rate of the influent therethrough.

A needle valve 92 controls the rate of flow of coolant through passage 86 and serves as a ratio controller to determine the relative flow rates of coolant through the tubes 48 and 50 of the FIG. 3 arrangement. This is directly accomplished by varying with valve 92 the rate of flow of coolant from the chamber 82 to the tube 50. Normally the needle valve 92 will be set before the machine is in operation, and a dial may be incorporated into the assembly to indicate its position.

The amplifier and proportional controller unit 88 may be controlled by either or both of the thermocouples 62 and 64. Thus, the total supply of coolant to the plunger may be determined by either the temperature of the lower portion or that of the upper portion of the plunger wall 42, or by the average of these temperatures. One satisfactory arrangement is suggested in FIG. 3, wherein the thermocouple 62 controls the operation of the proportional controller unit 88, and the thermocouple 64 is connected to an indicator 94. In this manner, the temperature of the separate portions of the wall 42 may be independently controlled through adjustments in the position of needle valve 92.

The packed bed of inert particles 66 which fills the plunger chamber 44 in each embodiment markedly increases the heat transfer rate between the coolant or air and the plunger wall 42 when they are highly heat conductive. The increased efficiency in turn reduces the amount of coolant used in the cooling system. The even distribution of the coolant or air over the inner faces of the wall 42 of the plunger produces a linear relationship between the temperature of the discharging air and the temperature of the wall. Because temperature control is precise and no large stresses are applied, a thinner wall may be used, which results in a lower temperature differential at opposite sides of the wall. The packed bed of conductive discrete particles assures even distribution of the heat transfer rate over the surface of the plunger preventing hot spots and chill spots from forming in the glass in contact with the outer surface of the plunger. The packed bed of discrete particles also permits precise temperature control over the outer surface of the plunger wall 42.

From the foregoing description those skilled in the art will appreciate that numerous modifications may be made of this invention without departing from its spirit. Therefore, we do not intend to limit the breadth of this invention to the specific embodiments illustrated and described. Rather, it is our intention that the breadth of this invention be determined by the appended claims and their equivalents.

What is claimed is:

1. In apparatus for forming hollow glass parisons, a hollow plunger comprising a hollow shell having an outer wall defining an internal chamber closed at one end and having a coolant discharge opening at its other end, first duct means extending into the plunger chamber and terminating adjacent the closed end thereof, second duct means extending into the plunger chamber and terminating intermediate its closed and discharge ends, a mass of discrete particles of material, which material is shape-retaining and infusible at the operating temperatures of the apparatus, packed into and filling the plunger chamber with coolant flow interstices defined between the particles substantially throughout the mass, said first and second duct means being provided with discharge openings located at various points within the mass and spaced appreciably inwardly of said shell wall, means for retaining the particles in packed condition within the plunger chamber, and means for supplying coolant medium through the duct means and the discharge openings thereof into the mass of discrete particles and against the inside of the plunger wall.

2. In apparatus for forming hollow glass parisons, a hollow plunger having a relatively thin outer wall defining an internal chamber closed at one end, a mass of discrete particles in the form of beads bounded by curvilinear surfaces packed into and filling the plunger chamber with coolant flow interstices intervening said particles and with said mass being in contact with the inner surface of the wall at closely spaced points substantially throughout the extent of the latter, said beads being formed of material which is shape-retaining and infusible at the operating temperatures of the apparatus, means spaced appreciably inwardly of said wall for directing coolant into the plunger chamber at various points within the packed mass of said particles, means for discharging coolant from the plunger chamber, means for measuring the temperature of the discharged coolant as it leaves the plunger chamber, and means responsive to said temperature measuring means controlling rate of flow of the coolant directed into the plunger chamber.

3. In apparatus for forming hollow glass parisons, a thin-walled hollow plunger shell defining an internal chamber having a closed first end and a coolant discharge opening at its second end, a mass of discrete particles, said particles having curvilinear surfaces and being of material which is shape-retaining and infusible at the operating temperatures of the apparatus, packed into and filling the plunger chamber with coolant flow interstices defined betwen the particles substantially throughout the mass, closing means at the second end of said shell confining said particles in packed condition within said chamber with said discharge opening formed therein, means for separately directing flow of coolant into different portions of the plunger chamber at points within the mass of discrete particles spaced appreciably inwardly from the inner surface of the plunger shell, and means associated with the flow directing means for independently controlling the separate flow of coolant into the different portions of the plunger chamber.

4. A plunger for forming hollow parisons from hot glass comprising a heat-transmitting wall defining an internal chamber closed at one end and open at the other, a mass of discrete particles of material, which material is shape-retaining and infusible at the operating temperatures of the apparatus, packed into and filling the plunger chamber with coolant flow interstices defined between the particles substantially throughout the packed mass, a first supply duct extending into the chamber from its open end and embedded in the mass of discrete particles, said first duct extending to a point adjacent the closed end of the chamber, a second supply duct extending into the chamber from its open end and embedded in the particles, said second duct extending to a point intermediate the open and closed ends of the chamber, means for directing a coolant through each of the ducts and discharging the coolant into the mass of discrete particles in the chamber at a plurality of points spaced appreciably inwardly from said wall, means substantially closing the open end of the chamber to retain said particles therein and having a coolant escape passage through which the coolant may discharge from the chamber, and temperature sensing means disposed adjacent the escape passage in a position permitting the coolant as it discharges from the chamber to flow thereover for measuring the temperature of the discharged coolant.

5. A plunger as defined in claim 4 further characterized in having a second temperature sensing means disposed beyond the end of the second duct and embedded within the mass of particles in the chamber for measuring the temperature of that portion of the coolant discharging from the chamber that was introduced by the first duct.

6. A plunger as defined in claim 5 further characterized by means independently controlling the flow rate of coolant through each of said supply ducts and means operatively connecting each temperature sensing means to the respective flow rate controlling means to regulate operation of the latter, whereby the flow rate of the coolant through each supply duct is a function of the temperature of the discharged coolant measured by the sensing means connected to the flow rate controlling means thereof.

References Cited by the Examiner

UNITED STATES PATENTS

| | | | |
|---|---|---|---|
| 780,863 | 1/05 | Coleman | 65—356 |
| 1,057,198 | 3/13 | Winder | 65—356 |
| 1,716,333 | 6/29 | Vuilleumier. | |
| 1,857,540 | 5/32 | Hardenberg | 65—356 X |
| 2,097,434 | 11/37 | De Baufre. | |
| 2,199,355 | 4/40 | Underwood | 65—355 X |
| 2,210,583 | 8/40 | Henry | 65—162 |
| 2,579,868 | 12/51 | Brucker | 257—262.1 X |
| 2,658,687 | 11/53 | Southworth | 65—162 X |
| 2,950,816 | 8/60 | Arenz | 65—355 X |
| 3,024,571 | 3/62 | Abbott et al. | 65—356 X |

FOREIGN PATENTS 611,680  1/61  Canada.

DONALL H. SYLVESTER, *Primary Examiner.*

UNITED STATES PATENT OFFICE
CERTIFICATE OF CORRECTION

Patent No. 3,171,731                      March 2, 1965

J Perry Barger et al.

It is hereby certified that error appears in the above numbered patent requiring correction and that the said Letters Patent should read as corrected below.

Column 7, line 10, after "chamber," insert -- means for retaining said particles within the plunger chamber, --.

Signed and sealed this 3rd day of August 1965.

(SEAL)
Attest:

ERNEST W. SWIDER                      EDWARD J. BRENNER
Attesting Officer                         Commissioner of Patents